United States Patent [19]

Simms

[11] 3,775,013

[45] Nov. 27, 1973

[54] OPTICAL TURBIDIMETER APPARATUS

[75] Inventor: Romilly J. Simms, Menlo Park, Calif.

[73] Assignee: Monitor Technology, Inc., Redwood City, Calif.

[22] Filed: Nov. 17, 1971

[21] Appl. No.: 199,700

[52] U.S. Cl. ............... 356/208, 356/205, 356/207, 356/222, 356/223, 356/246
[51] Int. Cl. ......................................... G01n 21/06
[58] Field of Search ................... 356/208, 205, 207, 356/222, 223, 246

[56] References Cited
UNITED STATES PATENTS

| | | | |
|---|---|---|---|
| 3,652,850 | 3/1972 | Briggs | 356/208 X |
| 3,506,360 | 4/1970 | Albert | 356/208 X |
| 3,510,666 | 5/1970 | Topol | 356/208 X |
| 3,664,744 | 5/1972 | Liston | 356/222 X |

*Primary Examiner*—Ronald L. Wibert
*Assistant Examiner*—Paul K. Godwin
*Attorney*—Lowhurst & Hamrick

[57] ABSTRACT

An optical turbidimeter is provided with means for selectively changing the direction of propagation through a medium of one or more beams of radiation from a radiation source for measuring the turbidity in said medium utilizing forward light scattering or side light scattering. With the radiation beams in a first predetermined direction, unscattered radiation is detected by a first detector and the radiation scattered by the medium is detected by a second detector. With the radiation beams then redirected, the roles of the detectors are reversed and the first detector detects the scattered radiation and the second detector detects the unscattered radiation. An electronic circuit coupled to the detectors generates a pair of ratios corresponding to the amount of scattered and unscattered radiation received by the detectors for each position of the radiation beams for generating a signal the magnitude of which is independent of the color of the medium, source and detector drift and absorption and scattering at the source and detector windows. The circuitry also includes means for compensating for ambient radiation.

13 Claims, 8 Drawing Figures

United States Patent
Simms
[11] 3,775,013
[45] Nov. 27, 1973
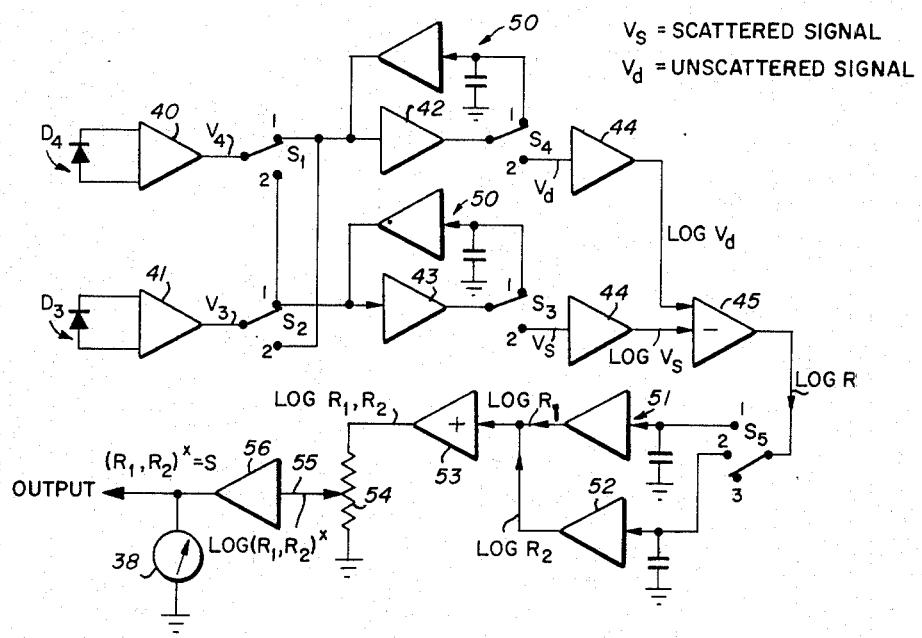

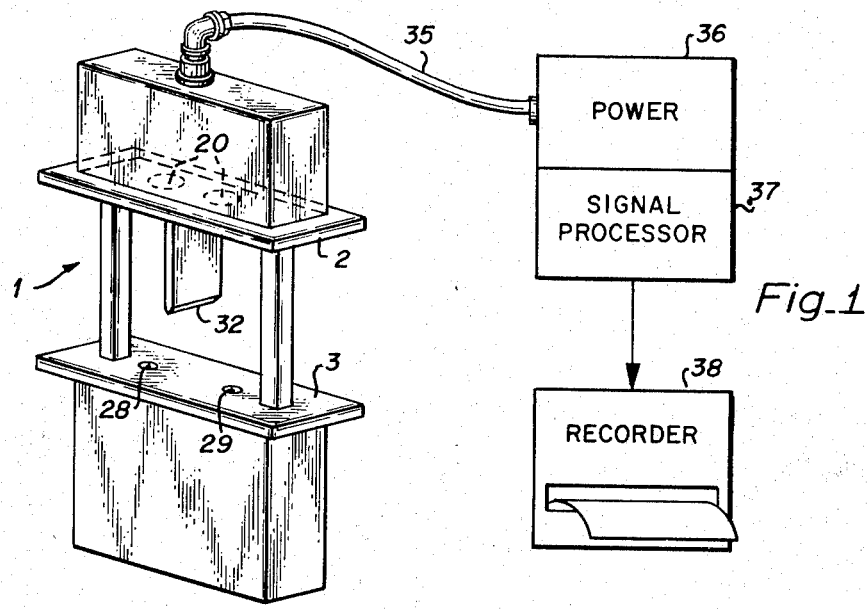
Fig._1
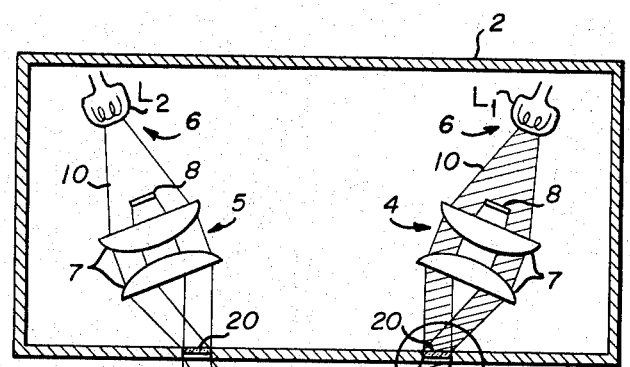
Fig._2
Fig._2A
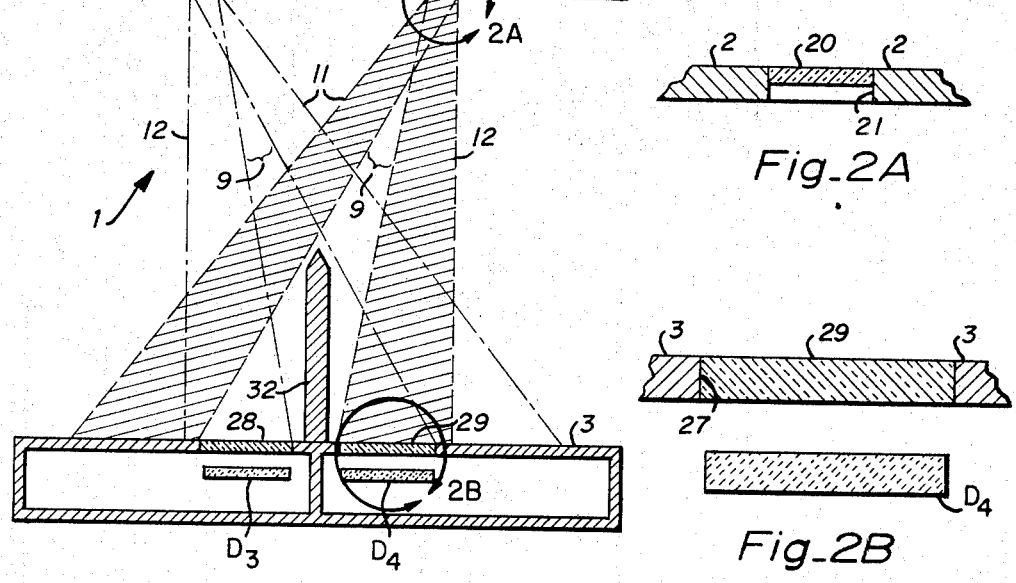
Fig._2B

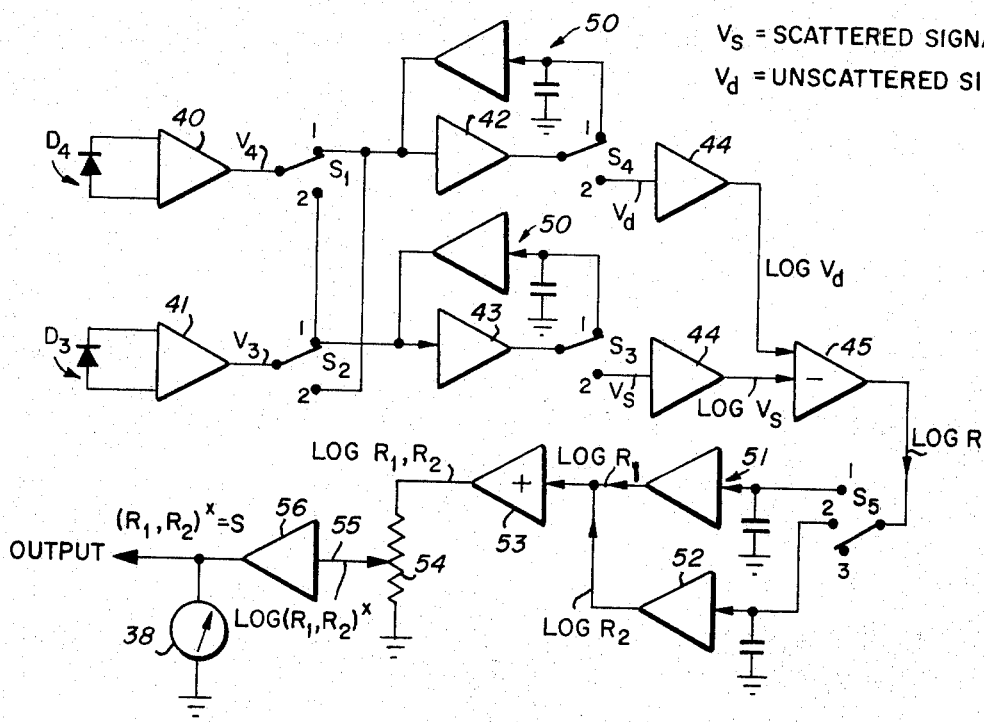
Fig_3
| FUNCTION | $L_1$ | $L_2$ | $S_1$ | $S_2$ | $S_3$ | $S_4$ | $S_5$ |
|---|---|---|---|---|---|---|---|
| BACKGROUND | OFF | OFF | 1 | 1 | 1 | 1 | 3 |
| $R_1$ | ON | OFF | 1 | 1 | 2 | 2 | 1 |
| BACKGROUND | OFF | OFF | 2 | 2 | 1 | 1 | 3 |
| $R_2$ | OFF | ON | 2 | 2 | 2 | 2 | 2 |
| REPEAT | | | | | | | |
Fig_3A

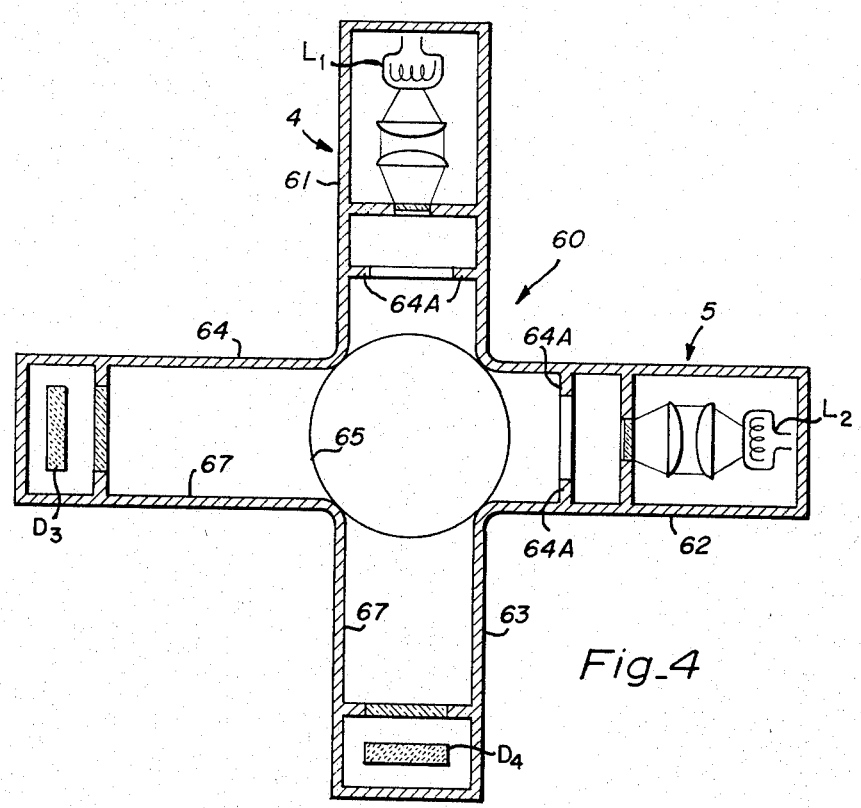
Fig_4
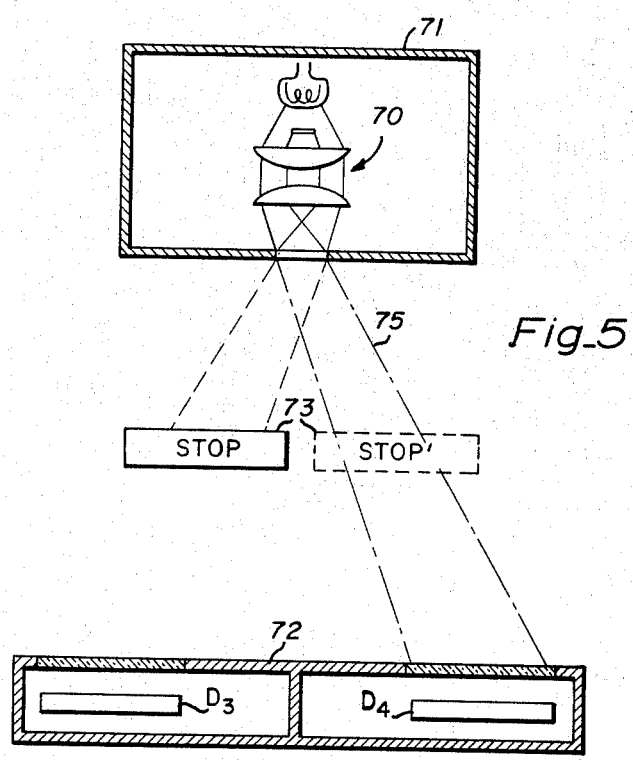
Fig_5

OPTICAL TURBIDIMETER APPARATUS

BACKGROUND OF THE INVENTION

The present invention relates generally to instrumentation for measuring and/or monitoring the turbidity of a medium and more particularly to a novel optical turbidimeter having a submersible sensor head for measuring the turbidity in a liquid. The sensor head and associated electronics cooperate to reduce maintenance problems and inaccurate measurements associated with dissolved color (absorption) in the medium and the accumulation of algae, grease, scale deposits and the like on the immersed surfaces which cause light scattering and misleading relative changes in the light levels at the detectors. These problems are especially acute when the turbidity of water is being measured or monitored.

As described in more detail in Applicant's copending application entitled "Forward Scatter Optical Turbidimeter Apparatus", Ser. No. 92,707 filed Nov. 25, 1970, turbidity is the name given to one of the optical properties of a medium and is related in a complex manner to the prosence, nature and the amount of discrete aggregations of material which scatter, reflect and diffuse light in an otherwise pure liquid carrier. Turbidity is usually observed as the degradation, due to light scattering, in the contrast of an image transmitted through a liquid, as for example, the visual Jackson Candle technique, or as the percentage of light emerging from a sample at angles different from the directly transmitted light as is electronically computed with instruments utilizing forward, perpendicular or back-scattering techinques.

In an environment wherein particulate material is typically encountered such as in water quality monitoring, settling lagoons, discharge outlets, natural water bodies and the like, an instrument utilizing forward or side-scattering techniques is found to be most suitable.

A prior known instrument adopted for use in such environments comprises a calibrating light, an operating light and a pair of photoelectric detectors. The calibrating light illuminates both detectors equally and is used to calibrate the instrument against initial color and turbidity levels. The operating light is used thereafter for measuring changes in the turbidity from the initial levels. A light shield or stop is positioned between the operating light and one of the detectors to shadow the latter detector from the operating light. The shielded detector is called the scatter cell and is intended to detect only the light scattered by the medium. The unshielded detector is called the transmit cell and receives the unscattered or directly transmitted light. Circuit means are coupled to the detectors for determining the ratio of the resistances of the scatter and transmit cells for providing a measure of turbidity of the medium.

The utilization of the described ratio techinque in presently available optical light turbidimeters provides turbidity measurements which are independent of source aging and liquid color since both affect the detectors equally.

Stray light from the bulb envelope, filament supports, etc., of the light source, light scattering from the light stop, light scattering from the transmit cell window into the scatter cell and irregular fouling of the detector windows by algae, grease, scaling, etc. together with changes in the sensitivity of the detectors and the effects of ambient light, however, all remain as a serious source of inaccuracies in turbidity measurements obtained with presently available submersible turbidimeters. In addition, a more precise measurement of turbidity is obtained using a current generator responsive to changes in light levels than is possible with resistance measurements as heretofore used.

SUMMARY OF THE INVENTION

A principal object of the present invention is therefore an improved, submersible optical turbidimeter for providing high sensitivity turbidity measurements in a medium, particularly liquids including water, independent of drift caused by source fluctuations and color in the liquid, extraneous ambient and scattered light from the head surfaces, irregular fouling of source and detector windows and changes in the sensitivity of the detectors.

A principal feature of the invention is a source of selectively directable radiation and a pair of radiation responsive detectors. Means are provided for independently directing the radiation from the source and sequencing the detectors for providing electronically a pair of ratios of the output signals of the detectors. With means for electronically combining the pair of ratios, turbidity measurements independent of detector sensitivity and the transmissivity of the detector windows are obtained.

Another feature of the present invention is an improved light source assembly and detector assembly geometry for reducing extraneous stray light from the source and for insuring an equal field of view for the detectors of both the direct and scattered light.

A further feature of the present invention is an electronic circuit for compensating for high level varying ambient light.

In one embodiment, the radiation source comprises a pair of light sources which are sequenced together with the detectors for providing the desired ratios.

In another embodiment, a single movable light source or a movable light stop, adopted for sequential positioning between a fixed centrally located light source and each of the detectors, may be used in lieu of the two fixed light sources.

In the dual source configuration, two embodiments of the invention are suggested. First, the sources are placed side-by-side in a water tight container spaced apart from the detectors which are similarly contained. Second, the sources and corresponding detectors are positioned across from each other at the ends of a cross-shaped housing provided with a centrally located passageway for receiving the medium.

These and other features of the invention together with these advantages will be apparent in the detailed description and accompanying drawings which follows hereinafter.

DESCRIPTION OF THE DRAWINGS

FIG. 1 is a perspective view of a forward-scatter optical turbidimeter incorporating features of the present invention.

FIG. 2 is an enlarged diagrammatical cross-sectional view in elevation of the submersible head of the turbidimeter of FIG. 1.

FIG. 2A is an enlarged view of section 2A—2A of FIG. 2.

FIG. 2B is an enlarged view of section 2B—2B of FIG. 2.

FIG. 3 is a schematic view of the signal processing and ambient light cancellation circuits of the present invention.

FIG. 3A is a function chart showing the relationship which prevails upon sequencing of the light sources and detectors of FIGS. 2 and 3.

FIG. 4 is a cross-sectional view of a side-scatter optical turbidimeter incorporating features of the present invention.

FIG. 5 is a cross-sectional elevation view of a single light source optical turbidimeter incorporating features of the present invention.

DETAILED DESCRIPTION

In accordance with the present invention, there is provided, as shown in FIG. 1, a novel and improved optical turbidimeter with a sensor head 1 adapted to be entirely submerged in a medium the turbidity of which is to be measured. With reference to a liquid water environment, the sensor head 1 comprises a pair of spaced apart water-tight housings 2, 3.

Water tight housing 2 contains a pair of light source assemblies 4, 5 disposed behind a pair of transparent windows 20 as shown in more detail in FIG. 2. Light source assemblies 4, 5 are provided with light bulbs $L_1$, $L_2$ respectively, and a lens system 7. A first light stop 8 is provided intermediate the lens system 7 and the light bulbs $L_1$, $L_2$ for creating a shadow 9 in a central portion of a beam 10 generated by the bulbs $L_1$, $L_2$ thereby dividing beam 10 into two beams, namely a scatter light beam 11 and a direct light beam 12. Referring also to FIGS. 2A and 2B, the bulbs $L_1$, $L_2$ are prefocused to image the filament at the outside surface of the source windows 20 associated with each source in the housing 2. The windows 20 are restricted by an iris 21 so that stray light from the bulb envelope, filament supports, etc. is eliminated. The imaging of the filament at the outside surface of the source windows 20 also results in non-uniform coatings on the windows affecting equally the beams 11 and 12.

Water tight housing 3 contains a pair of water-tight detector windows 28, 29 behind which are positioned a pair of light sensitive detectors $D_3$, $D_4$. $D_3$ and $D_4$ are preferably linear with incident optical power as obtained using silicon cells as photocurrent generators. As shown in FIGS. 2 and 2B, detectors $D_3$, $D_4$ are bounded by an iris 27 and spaced therefrom to insure an equal field of view to both the scattered and the unscattered radiation. The equivalence of the field of view means that non-uniform window coatings have an equal influence when the detectors are being used as scattered beam detectors or as direct beam detectors.

A second light stop 32 is provided between the detectors $D_3$, $D_4$ and projects into the shadow 9 created by the first light stop 8 associated with each of the light source assemblies 4, 5. The second light stop 32 serves to prevent light scattered by the source windows 20 from reaching the scattered light detector. The stop 32 also serves to prevent light scattered by the direct light detector window from reaching the scattered light detector. It will be noted in more detail below that when source assemblies 4,5 are sequenced, each detector will alternately respond first as a scatter light detector and then as a direct light detector. The shadow 9 by the first stop 8 associated with each of light source assemblies 4, 5 further serves to reduce the level of light scattered from the surfaces of the second light stop 32.

Referring to FIG. 1, power to the sensor head and the output signals from the detectors $D_3$, $D_4$ are coupled by means of a length of water-tight cable 35 to a source of power 36, a signal processor 37 and a turbidity indicator meter or recorder 38 located on the surface of the water. Detectors $D_3$, $D_4$ are coupled to an electronic circuit which is located in and comprises signal processor 37. Signal processor 37 computes the desired ratios of the output signals of detectors $D_3$, $D_4$ to provide the measure of turbidity which is independent of the factors previously discussed.

Referring to FIG. 3, detector $D_4$ is series coupled to an amplifier 40 and the common pole of a switch $S_1$. Detector $D_3$ is series coupled to an amplifier 41 and the common pole of switch S2. Both switch S1 and S2 have a pair of contacts 1, 2. Contact 1 of switch S1 is coupled to the input of an amplifier 42 and to contact 2 of switch S2. Contact 1 of switch S2 is coupled to the input of an amplifier 43 and to contact 2 of switch S1.

To provide the appropriate ratio of the outputs of detectors $D_3$, $D_4$ corresponding to the sequencing of the radiation from the light source described herein, it is apparent that the cross-coupling of switches S1, S2 as described will always result in amplifier 42 receiving its input from the detector responding to unscattered light from the radiation source while amplifier 43 will always receive its input from the detector responding to the light scattered by the medium to produce voltage signals $V_d$ and $V_s$ respectively.

Referring again to FIG. 3, it will be noted that each of amplifiers 42, 43 is series coupled to the common pole of switches S4, S3. S3, S4 has a pair of contacts 1, 2. Contact 2 of each of switches S3, S4 is coupled to the input of a separate log amplifier 44 and the outputs serve as the input to a difference amplifier 45 which generates a signal proportional to the log of the ratio of the outputs of detectors $D_3$, $D_4$. While any number of circuits could be used for forming the desired ratios, log circuits are preferred for their simplicity.

Coupled to contact 1 of each of switches S4, S3 and the inputs of amplifiers 42, 43 is a sample and hold circuit 50 which is switched into operation intermediate the sequencing of the light bulbs $L_1$, $L_2$ and detectors $D_3$, $D_4$, as shown in the function diagram of FIG. 3A, to measure the output of the detectors due to background radiation or ambient light. The signal generated thereby is cancelled from the signal received by amplifiers 42, 43 during the measurement of the scattered and unscattered radiation.

The output of difference amplifier 45 is coupled to the input of a third and a fourth sample and hold circuit 51, 52 through a pair of switch contacts 1, 2 of a switch S5 which also has a third contact 3. Contact 3 of switch S5 is not connected and is used when the background radiation signal level is being measured.

The outputs of sample and hold circuits 51, 52 serve as inputs to a summing amplifier 53 to form the sum of the logs of the two ratios formed during a complete sequencing of the radiation in the medium as shown in FIG. 3A. The output of summing amplifier 53 is applied across a voltage divider 54, the center tap 55 of which provides an input signal to an antilog amplifier 56 for providing a signal proportional to a root of the product of the aforementioned two ratios. The term root is understood to include all values of $\chi$ as in $A^\chi$ where $\chi$ is less than one. The signal provided thereby is used to drive a meter 39, or the indicator 38 shown in FIG. 1 which is provided with an appropriate scale for indicating the turbidity of the medium under investigation.

The filaments of bulbs $L_1$ and $L_2$ of source assemblies 4, 5 are coupled to a power source, not shown, through a switch, not shown. The switch controls the illumination of bulbs $L_1$, $L_2$ in accordance with the function diagram of FIG. 3A to provide control over the direction of propagation of the radiation through the medium.

The turbidity ratios $R_1$ and $R_2$ obtained with bulbs $L_1$, $L_2$ alternately switched on and off are as follows:

Condition 1. $L_1$ on, $L_2$ off.

$$R_1 = V_3/V_4 = [L_1 T_1 S(1-A)(1-S)\ T_3 D_3]/[L_1 T_1 (1-A)(1-S)\ T_4 D_4] = (ST_3 D_3)/(T_4\ D_4)$$

Condition 2. $L_1$ off, $L_2$ on.

$$R_2 = V_4/V_3 = [L_2 T_2 S(1-A)(1-S)\ T_4 D_4]/[L_2 T_2 (1-A)(1-S)\ T_3 D_3] = (ST_4 D_4)/(T_3\ D_3)$$

Such that the antilog of the sum of the log of the ratios is:

$$R_1 R_2 = (ST_3 D_3)/(T_4\ D_4) \times (ST_4 D_4)/(T_3\ D_3) = S^2$$

$$\text{and } S = (R_1, R_2)$$

where
$L_1$, $L_2$ are source intensities
$T_1, T_2$ are average source window transmittances
$T_3$, $T_4$ are average detector window transmittances
$D_3$, $D_4$ are detector sensitivities
$S$ is forward scattering efficiency of the particles in the liquid
$A$ is color absorbance
$V_3$, $V_4$ are detector voltages
$R_1$, $R_2$ are ratios of signals.

Thus, it can be seen that by exercising control over the direction of propagation of the radiation through the medium, two ratios are obtained to provide a measure of the turbidity which is independent of detector sensitivity and the detector window transmittance.

Referring to FIG. 4, there is shown an alternative embodiment of the present invention using side light scattering. A cross-shaped housing 60 is provided with four mutual perpendicular conduits or arms 61, 62, 63, 64. A passageway 65 is centrally located between arms 61–64 for receiving the medium the turbidity of which is to be measured. Source assemblies 4 and 5 are located in the ends of arms 61, 62 and detectors $D_3$ and $D_4$ are located in the ends of arms 63, 64 respectively. Located in each of arms 61, 62 between the passageway 65 and source assemblies 4, 5 is a circular aperture 64A. The interior surfaces 67 of arms 63, 64 serve as light stops to prevent light scattered from one of the detector windows from reaching the other detector while the apertures 64A in arms 61, 62 serve as light stops to prevent light scattered at the source windows from reaching the scattered light detector. With the exception of the aforementioned features and no necessity for first stop 8 in the source assemblies 4, 5 the arrangement and operation of the sources, detectors and associated electronics may be identical to that described with respect to FIGS. 1–3.

In lieu of using two sources of radiation, a single source and a movable light stop can be employed in practicing this invention.

Referring to FIG. 5, a source of radiation 70 is provided in a water-tight housing 71 for providing a beam of radiation 75. A pair of detectors $D_3$, $D_4$ is provided in a water-tight housing 72. A movable light stop 73 is provided intermediate housing 71 and housing 72 to selectively intercept beam 75 to determine which of detectors $D_3$, $D_4$ is to serve as the scattered light and direct light receiver. The mechanism for controlling the position of light stop 73 is of any suitable construction and is omitted for clarity as considered to be within the capability of one skilled in the art to construct.

In practice, when stop 73 is in the left position as shown, detector $D_3$ will serve as the scattered light detector and detector $D_4$ will serve as the direct light detector. The opposite will be true when stop 73 is in the right position as shown in dashed lines.

As with the embodiment of FIG. 4, the arrangement and operation of the source, detectors and electronics may be identical to that described with respect to FIGS. 1–3 or FIG. 4.

Therefore, in accordance with the present invention, it will be apparent by reference to FIGS. 3 and 3A that the detector outputs in response to background radiation are first stored in sample and hold circuits. A first ratio of scattered to unscattered signals is computed with the respective background signals subtracted from the outputs of detectors $D_3$ and $D_4$, and is stored in a sample and hold circuit with one of the detectors responding to direct or unscattered radiation while the other detector serves to provide an output signal in response to the radiation scattered by the medium through which the radiation passes. The radiation source is then extinguished and a second background radiation signal is detected and stored for subtraction from a second ratio signal generated with the roles of the detectors reversed by redirecting the radiation through the medium such that the former direct radiation detector becomes the scattered radiation detector and the former scattered radiation detector serves to detect the direct radiation.

After processing the two ratios thus formed, the sequence of stops is repeated. The readout scales are calibrated to provide a linear measure of the turbidity in Jackson Turbidity Units to provide a correlation with the turbidity measured in accordance with the well-known Jackson candle technique.

While only forward and side scattering instruments are described, for they are most suitable in water environments, back scattering instruments, it will be appreciated, may also incorporate the novel source and detector construction described as well as the electronics which provide a measure of turbidity independent of factors which heretofore have produced inaccuracies in measurements with conventional instruments.

What is claimed is:

1. An optical turbidimeter comprising:
   a source of radiation for irradiating a medium the turbidity of which is proportional to the amount of said radiation scattered by said medium;
   a pair of detectors responsive to unscattered radiation from said source and radiation scattered by said medium;
   a passageway between said source and said detectors for receiving said medium;
   means for selectively directing said radiation through said medium for providing a first signal from a first one of said pair of detectors proportional to the amount of said radiation which is not scattered by said medium and a second signal from a second one of said detectors proportional to the amount of said radiation which is scattered by said medium;

means for selectively redirecting said radiation through said medium for providing a third signal from said first one of said pair of detectors proportional to the amount of said radiation which is scattered by said medium and a fourth signal from said second one of said detectors proportional to the amount of said radiation which is not scattered by said medium;

means coupled to said first and second detectors for selectively generating and storing a fifth signal proportional to the ratio of the magnitudes of said first and said second signals and a sixth signal proportional to the ratio of the magnitudes of said third and said fourth signals; and means coupled to said fifth and said sixth signal for generating and storing means for providing a seventh signal which is the root means square of the product of said fifth and said sixth signal and therefore proportional to the turbidity of said medium.

2. An optical turbidimeter according to claim 1 wherein said source of radiation comprises a first light source and a second light source and said means for selectively redirecting said radiation through said medium comprises means for selectively illuminating said first and said second light sources for generating sequentially said fifth and said sixth signal respectively.

3. An optical turbidimeter according to claim 2 wherein said first light source is positioned substantially opposite said first detector and said second light source is positioned substantially opposite said second detector and further comprising:

a first light stop projecting toward said sources positioned between said first and said second detectors for shadowing said second detector from unscattered light from said first light source and for shadowing said first detector from unscattered light from said second light source.

4. An optical turbidimeter according to claim 3 wherein each of said light sources comprise:
a light bulb;
a beam forming lens system; and
a light stop positioned between said bulb and said lens system for creating a shadow in a central portion of said beam, said shadow serving to reduce the scattering of light from the surface of said first light stop.

5. An optical turbidimeter according to claim 4 wherein said light sources are contained within a first water-tight housing, said housing comprising a source window associated with each of said sources of transmitting said beam from each of said sources into said medium, said light sources further comprising means for imaging the filament of said bulb on the outer surface of said window for reducing stray light from entering said medium from said bulb envelope, filament supports and other source structure.

6. An optical turbidimeter according to claim 5 wherein said detectors are contained within a second water-tight housing, said housing comprising a detector window associated with each of said detectors for transmitting light from said medium to said detectors, said housing further comprising means for supporting said detectors a predetermined distance from said windows for providing an equal field of view for said detectors to both scattered and unscattered light from said medium.

7. An optical turbidimeter according to claim 1 wherein said fifth and sixth signal generating means comprises means for generating sequentially said fifth signal proportional to the logarithm of the ratio of said first and said second signals and said sixth signal proportional to the logarithm of the ratio of said third and said fourth signals and wherein said seventh signal generating means comprises means for summing and dividing the sum of said fifth and said sixth signal by a predetermined amount for generating said seventh signal proportional to a root of the product of said fifth and said sixth signals.

8. An optical turbidimeter according to claim 7 further comprising means for generating a correction signal from each of said detectors proportional to the ambient light irradiating said medium and wherein said fifth and said sixth signal generating means further comprises means for changing the magnitude of said fifth and said sixth signal in proportion to the magnitude of said correction signal for providing a measure of the turbidity of said medium independent of ambient light irradiating said medium.

9. An optical turbidimeter according to claim 2 wherein said passageway between said source and said detectors for receiving said medium comprises a cross-shaped housing with four mutually perpendicular radially extending arms and wherein opposing ones of said arms serve to contain one of said light sources and one of said detectors respectively.

10. An optical turbidimeter according to claim 9 wherein each of said light sources comprise:
a light bulb;
a beam forming lens system for forming a beam from said light source; and
a light stopping aperture located in the radial arm containing said light source for preventing said beam from illuminating the walls of said arm perpendicular thereto containing said detector.

11. An optical turbidimeter according to claim 10 wherein said light sources are contained within a first watertight housing, said housing comprising a source window associated with each of said sources of transmitting said beam from each of said sources into said medium, said light further comprising means for imaging the filament of said bulb on the outer surface of said window for reducing stray light from entering said medium from said bulb envelope, filament supports and other structure.

12. An optical turbidimeter according to claim 11 wherein said detectors are contained within a second watertight housing, said housing comprising a detector window associated with each of said detectors for transmitting light from said medium to said detectors, said housing further comprising means for supporting said detectors a predetermined distance from said windows for providing an equal field of view for said detectors to both scattered and unscattered light from said medium.

13. An optical turbidimeter according to claim 9 wherein said fifth and sixth signal generating means comprises means for generating sequentially said fifth signal proportional to the logarithm of the ratio of said first and said second signals and said sixth signal proportional to the logarithm of the ratio of said third and said fourth signals and wherein said seventh signal generating means comprises means for summing and dividing the sum of said fifth and said sixth signal by a predetermined amount for generating said seventh signal proportional to a root of the product of said fifth and said sixth signals.

* * * * *